(12) United States Patent
Holt et al.

(10) Patent No.: US 9,292,346 B1
(45) Date of Patent: Mar. 22, 2016

(54) SYSTEM AND METHOD FOR DYNAMICALLY MANAGED TASK SWITCH LOOKAHEAD

(71) Applicants: James C. Holt, Austin, TX (US); Brian C. Kahne, Austin, TX (US); William C. Moyer, Dripping Springs, TX (US)

(72) Inventors: James C. Holt, Austin, TX (US); Brian C. Kahne, Austin, TX (US); William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 29 days.

(21) Appl. No.: 14/468,969

(22) Filed: Aug. 26, 2014

(51) Int. Cl.
*G06F 9/46* (2006.01)
*G06F 9/48* (2006.01)
*G06F 9/50* (2006.01)
*G06F 9/32* (2006.01)
*G06F 9/38* (2006.01)

(52) U.S. Cl.
CPC ............. *G06F 9/4881* (2013.01); *G06F 9/321* (2013.01); *G06F 9/3869* (2013.01); *G06F 9/461* (2013.01); *G06F 9/50* (2013.01)

(58) Field of Classification Search
CPC ....... G06F 9/321; G06F 9/3869; G06F 9/461; G06F 9/4881; G06F 9/50
USPC .......................................................... 718/108
See application file for complete search history.

(56) References Cited

U.S. PATENT DOCUMENTS

| 5,887,159 | A | 3/1999 | Burrows | |
|---|---|---|---|---|
| 7,979,683 | B1* | 7/2011 | Danskin | G06F 9/461 712/226 |
| 8,443,171 | B2 | 5/2013 | Morris et al. | |
| 2004/0117557 | A1 | 6/2004 | Paulraj et al. | |
| 2014/0359636 | A1* | 12/2014 | Xu | G06F 9/4856 718/108 |

* cited by examiner

*Primary Examiner* — Qing Chen (57) ABSTRACT

A processing system includes a processor pipeline, a detector circuit, and a task scheduler. The detector circuit includes a basic block detector circuit to determine that the processor pipeline received a first instruction of a first instance of a basic block, and to determine that a last-in-order instruction of the first instance of the basic block is a resource switch instruction (RSWI), and an indicator circuit to provide an indication in response to determining that the processor pipeline received the first instruction of a second instance of the basic block. The task scheduler initiates a resource switch, in response to the indication, at a time subsequent to the first instruction being received that is based on a cycle count that indicates a first number of processor cycles between receiving the first instruction and receiving the RSWI.

19 Claims, 8 Drawing Sheets

2
SYSTEM AND METHOD FOR DYNAMICALLY MANAGED TASK SWITCH LOOKAHEAD

FIELD OF THE DISCLOSURE

This disclosure generally relates to a data processing system, and more particularly to a system and method for managed task switch lookahead.

BACKGROUND

Generally, multi-core processing systems operate to execute program instructions to perform various data processing tasks. A task scheduler assigns a particular core to execute a program to process the data associated with that program. This combination of a program and corresponding data represents a specific task that is to be executed by the processing system, and in particular, once assigned to the core, this combination represents a specific task of the core. Each core can be assigned multiple tasks.

A task is divided into one or more portions that are referred to as jobs. When a task has multiple jobs, each job represents an operation of the task that is performed without being interrupted by a task switch. A job can be executed by a core between task switch instructions, or a job can be executed by a non-core resource. For example, a core can transfer the control to a hardware accelerator. When control of a job is transferred to a non-core resource, the core assigned to process the job does not actively process the job and the core is available to execute a job from another task. When the non-core resource is finished executing the job, a next job of the original task can be scheduled to be executed by the original core, or by another core.

A core switches between tasks on job boundaries, that is, after completion of one job and before starting a next job. When a core completes a job, the task scheduler determines the next job to assign to the core to more efficiently execute the tasks by the multi-core processing system. Task switching provides a benefit of enabling a core to execute multiple tasks in a time-sliced manner.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An embodiment of a multi-core processing system is disclosed that includes a task switch marker table that identifies the addresses of first-in-order instructions within basic blocks (sets of instructions that have only one entry point and only one exit point) that are last-in-order basic blocks of their particular jobs, and that provides a predictive launch delay (a number of processor cycles) associated with each identified basic block. When a processor core of the multi-core processing system identifies that it is processing a new basic block, the processor core searches the task switch marker table to see if the address of the first-in-order instruction of the new basic block matches any of the identified basic blocks. If so, the processor core loads the launch delay value associated with the identified basic block to a counter and decrements the counter with each subsequent instruction received by the processor core. When the counter is decremented to zero, the processor core provides an indication to a task scheduler of the multi-core processing system to initiate a predictive task switch for the processor core, by pre-loading context information associated with a next task into an alternate register file of the processor core. Then, when the next task is tasked to the processor core, the task switch operation is performed without the delay normally associated with loading of context information, by merely switching the processor core operation to the alternate register file. As used herein, the term "processor cycle" is intended to mean a periodic signal received or generated by a processing system, including a clock cycle, an instruction cycle, a divided clock cycle, and the like.

The processor core determines when a basic block is the last-in-order basic blocks of the associated job. When the processor core receives the first-in-order instruction of a basic block, the processor core checks to see if the address of the first-in-order instruction is stored in the task switch marker table. If not, the processor core provisionally stores the address of the first-in-order instruction, and starts a second counter that counts the number of processor cycles until the processor core receives the last-in-order instruction of the basic block. The last-in-order instruction of a basic block will be either a change of flow instruction (COFI) or a resource switch instruction (RSWI). If the last-in-order instruction of the basic block is a COFI, then the basic block is not the last-in-order basic block of the job, and the processor core provisionally stores the address of the next instruction, that is the first-in-order instruction of the next basic block, writing over the previously stored address, and resets and restarts the second counter. If the last-in-order instruction of the basic block is a RSWI, then the basic block is the last-in-order basic block of the job, and the processor core writes the provisionally stored address and the value of the second counter, referred to as the cycle count, into the task switch marker table.

When the provisionally stored address and the cycle count are stored into the task switch marker table, the processor core provides an indication to the hardware task scheduler that the new task switch marker table entry (MTE) has been stored in the task switch marker table. The hardware task scheduler retrieves the cycle count for the new MTE, subtracts a number of cycles needed to pre-load context information associated into the alternate register file of a processor core, and re-writes the difference, referred to as the launch delay, to the task switch marker table.

Figure 1:
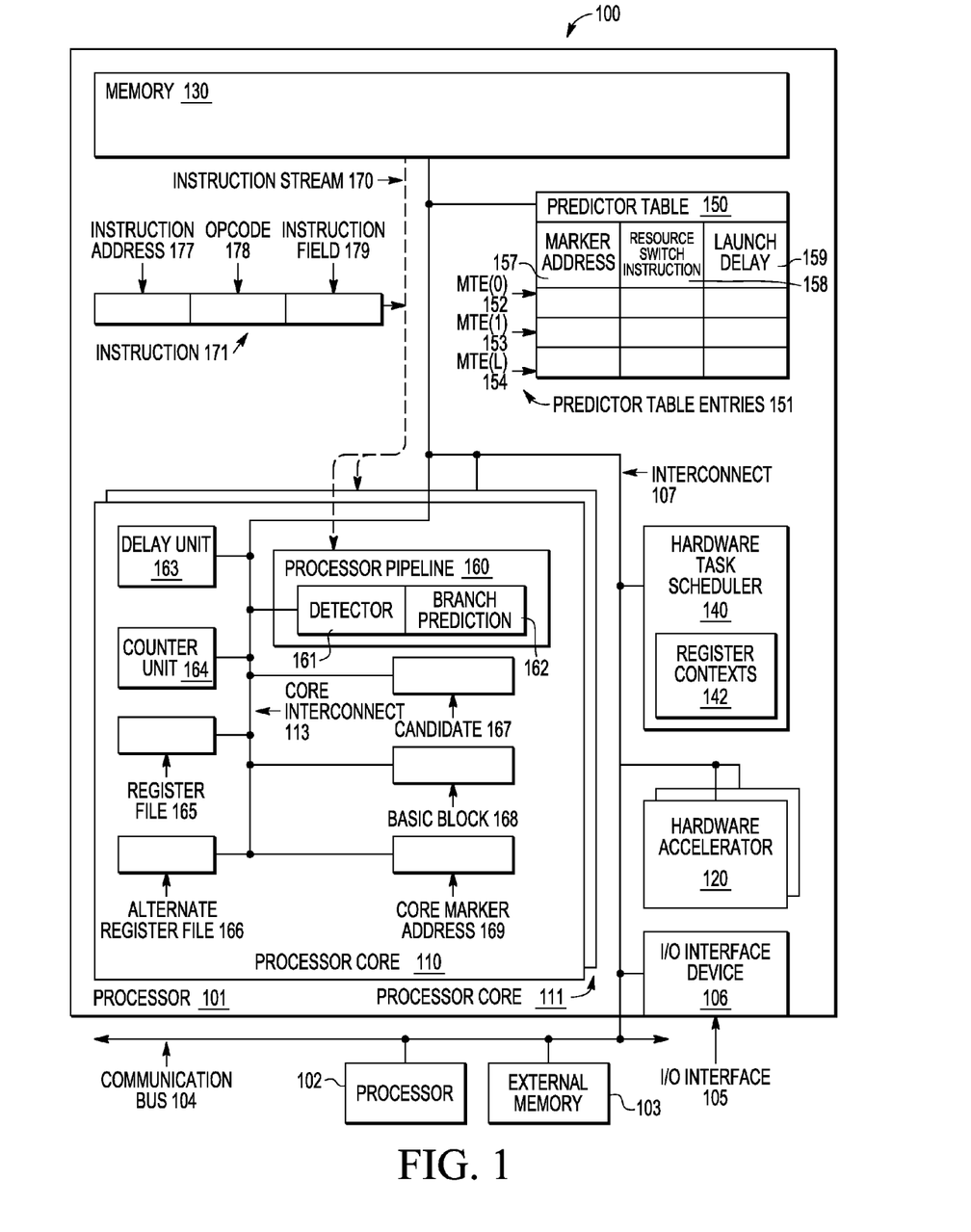
FIG. 1 is a block diagram illustrating a multi-core processing system that schedules processing of data in a time-sliced manner, according to an embodiment of the present disclosure.

FIG. 1 illustrates a multi-core processing system 100 that schedules processing of data in a time-sliced manner. Multi-core processing system 100 includes a processor 101, one or more additional processors 102, and an external memory 103. Processors 101 and 102 communicate with each other and with external memory 103 via a communication bus 104. In particular, processors 101 and 102 store data to and receive data and programs from external memory 103. Processor 101 also sends and receives data and programs, via an input/output (I/O) interface 105 that is connected to other devices (not shown) of multi-core processing system 100. Other devices can be connected to communication bus 104 as needed or desired.

Processor 101 includes an I/O interface device 106, connected to I/O interface 105, one or more cores 110 and 111, one or more hardware accelerator 120, a memory 130, a hardware task scheduler 140 that includes register contexts 142 for all running tasks, and a task switch marker table 150. Cores 110 and 111, hardware accelerator 120, memory 130, task scheduler 140, task switch marker table 150, and I/O interface device 106, communicate with each other, via an interconnect 107. Interconnect 107 operates to provide an instruction stream 170 from memory 130 to cores 110 and 111. Interconnect 107 also operates to provide execution parameters and data to hardware accelerator 120 such that, when control of a job is passed from one of cores 110 or 111 to the hardware accelerator, the hardware accelerator completes the job. An example of hardware accelerator 120 includes, a network processor, a data stream processor, a security device, an encryption device, a decryption device, a statistics device, a graphics device, an audio and a video processor, a digital signal processor, a vector processing device, a floating point device, a single instruction multiple data (SIMD) processing element, a transactional memory processor, and the like.

Cores 110 and 111, hardware task scheduler 140, and I/O interface device 106, may represent a general purpose processor, a digital signal processor, another type of logic circuit capable of performing operations, and the like. In an exemplary embodiment, cores 110 and 111 represent instruction-based processors.

Hardware task scheduler 140 assigns and schedules tasks in processor 101 by assigning a program and the corresponding data to a specific resource, such as core 110 or hardware accelerator 120. Task switch marker table 150 includes information about assigned and scheduled tasks, and hardware task scheduler 140 utilizes the information in the task switch marker table to assign tasks and make scheduling decisions. In a particular embodiment, a task switch marker table similar to task switch marker table 150 is included in each core 110 and 111.

Task switch marker table 150 has a fixed size and number of task switch marker table entries (MTEs) 151, such as MTE(0) 152, MTE(1) 153, and MTE(L) 154. MTEs 151 are managed by a policy, such as a least recently used (LRU), a Pseudo LRU, a Protected LRU, a Most Recently Used (MRU), a Not Recently Used(NRU), a Re-Reference Interval Prediction (RRIP), a Least Frequently Used (LFU), and a Set Dueling (dynamically select) policy, and the like. Each of MTEs 151 has task specific information fields including a marker address 157, resource switch instruction attributes 158, and a launch delay 159, described in more detail below.

Core 110 includes a processor pipeline 160, a delay unit 163, a counter unit 164, a register file 165, an alternate register file 166, a candidate flag 167, a basic block flag 168, a core marker address field 169, and a core interconnect 113. Core interconnect 113 is connected to interconnect 107. Processor pipeline 160 has a detector 161, and a branch prediction module 162. The devices of core 110, such as detector 161 and delay unit 163, communicate with each other, and with devices of processor 101, for example memory 130 and task switch marker table 150, via core interconnect 113 and interconnect 107. Interconnects 107 and 113 enable core 110 to send a request for instructions and data to memory 130, and receive requested instructions and data from the memory for processing by the core.

A fetch and decode unit of processor core 110 (not shown) receives and decodes instructions from instruction stream 170, and detector 161 determines a position of instructions within the instruction stream, and maintains information in the devices of core 110 and task switch marker table 150. The information includes operations specified and positions of instructions, associated with a specific set of instructions. For example, detector 161 can include a basic block detector circuit operable that can detect various instructions within a basic block, and a detector circuit that can provide various functions, as described below.

Each instruction in instruction stream 170 has a format as indicated by a representative instruction 171, that detector 161 utilizes to determine an operation specified and a position of the instruction within the instruction stream, as described below. Instruction 171 includes an instruction address 177, an opcode 178, and an instruction field 179. In particular, instruction address 177 is typically not an explicit portion of instruction 171, but is implied from the location of the instruction in instruction stream 170. Thus, in a particular embodiment, the fetch and decode unit can derive instruction address 177 from instruction stream 170. Instruction 171 also includes task information associated with the instruction that, together with instruction address 177, uniquely identifies the instruction within instruction stream 170. A value in Opcode 178 field specifies the operation to be performed by instruction 171. Instruction field 179 has additional instruction information associated with instruction 171. For example, the additional instruction information may include the specification of one or more registers, one or more flags, and the like. In order to maintain information associated with specific sets of instructions, detector 161 may store the value included in instruction address 177, referred hereinafter as a marker address, in core marker address field 169.

Detector 161 also directs counter unit 164 to count the number of instructions received by processor core 110, also referred herein as the cycle count, between issue of the specific instruction associated with the marker address, also referred herein as a marker instruction, and the issuance of a resource switch instruction (RSWI). Counter unit 164 starts the cycle count from zero (0), and the marker instruction and the RSWI are part of the same specific set of instructions. When detector 161 detects the issue of the RSWI, the detector may store information in a vacant (free) MTE of task switch marker table 150. In particular, detector 161 may store the marker address from core marker address field 169 to marker address 157, the attributes of the RSWI to resource switch instruction attributes 158, and the cycle count from counter unit 164 to launch delay 159. Detector 161 may also communicate to hardware task scheduler 140 that task switch marker table 150 has been updated and provide the marker address associated with the update to the task scheduler. In response, hardware task scheduler 140 may update launch delay 159 at the newly filled MTE corresponding to the marker address, based on information at the newly filled MTE. For example, launch delay 159 can be updated with a launch delay cycle count that would allow a scheduling decision pre-computation to be performed, such that the scheduling decision would coincide with the issue of the resource switch instruction. Here, when detector 161 subsequently detects the issue of an instruction having an instruction address 177 that matches a particular marker address 157 at a particular MTE 151, referred to as the matching MTE, the detector directs delay unit 163 to start counting down a launch delay cycle count, where the launch delay cycle count includes launch delay 159 of the matching MTE, as updated by hardware task scheduler. Delay unit 163, after completing the count down of the launch delay cycle count, requests hardware task scheduler 140 to pre-compute a scheduling decision for the upcoming resource switch instruction corresponding to core marker address field 169.

Hardware task scheduler 140 receives the request to pre-compute the scheduling decision and corresponding core marker address field 169 from delay unit 163, determines a matching MTE that stores a matching marker address 157, determines the hardware resource based on the matching MTE's resource switch instruction attributes 158, and pre-computes the scheduling decision, where the scheduling decision may take multiple cycles to be made. In an embodiment, hardware task scheduler 140 stores the scheduling decision at the matching MTE (not shown). Alternatively, hardware task scheduler 140 includes a scheduling decision table (not shown) where the scheduling decision and associated information, such as the marker address value, are maintained. Pre-computing the scheduling decision includes: assigning and scheduling a resource, such as hardware accelerator 120 or core 111, as specified by resource switch instruction attributes 158 at the matching MTE, to process the next portion of the current task; pre-loading the resource with context information for the next portion of the current task; assigning and scheduling the current resource, core 110, to process a next portion of a next task; and pre-loading core 110 with the context information for the next portion of the next task. By pre-computing the scheduling decision, hardware task scheduler 140 may minimize or eliminate the time needed to make the scheduling decision and to pre-load the context information, also referred herein as latency of the scheduling decision, during execution of the RSWI. In this manner, the scheduling decision may be made by the time the resource switch is requested. In response to core 110 executing the RSWI, hardware task scheduler 140 switches the portions of the tasks from current resources to next resources based on the previously pre-computed scheduling decision corresponding to the RSWI. The operation of detector 161, delay unit 163, counter unit 164, and hardware task scheduler 140, is further described below.

Branch prediction module 162, in response to receiving a branch instruction, makes a speculative prediction as to whether the branch will be taken or not and what the target of the branch is likely to be, and performs a pre-fetch of instructions for the predicted branch. Examples of branch instructions and branch predictors in processing devices are well known in the art, and will not be further elaborated on herein.

Processor 101 implements an instruction set architecture that specifies an instruction set, data types, addressing modes, memory architecture, interrupt and exception handling, I/O architecture, a set of architectural registers, and other elements related to programming of the processing device. In the illustrated embodiment, core 110 includes two sets of physical registers, register file 165 and alternate register file 166, that are implemented in the micro-architecture, such that the architectural registers can be mapped to one of the two sets of physical registers and switched to the other set of physical registers in response to a context switch. For example, when core 110 is executing instructions for a current portion of a current task having the architectural registers mapped to register file 165 and a RSWI occurs, which requires hardware task scheduler 140 to make a scheduling decision, the architectural registers' mapping can be switched to alternate register file 166 for executing the instructions corresponding to a next portion of a next task. The two sets of physical registers allows hardware task scheduler 140 to pre-load the context information for the next portion of the next task at alternate register file 166 while core 110 utilizes register file 165 for the current portion of the current task, such that the latency associated with loading the context information can be minimized or eliminated from the actual context switch when it occurs.

Figure 2:
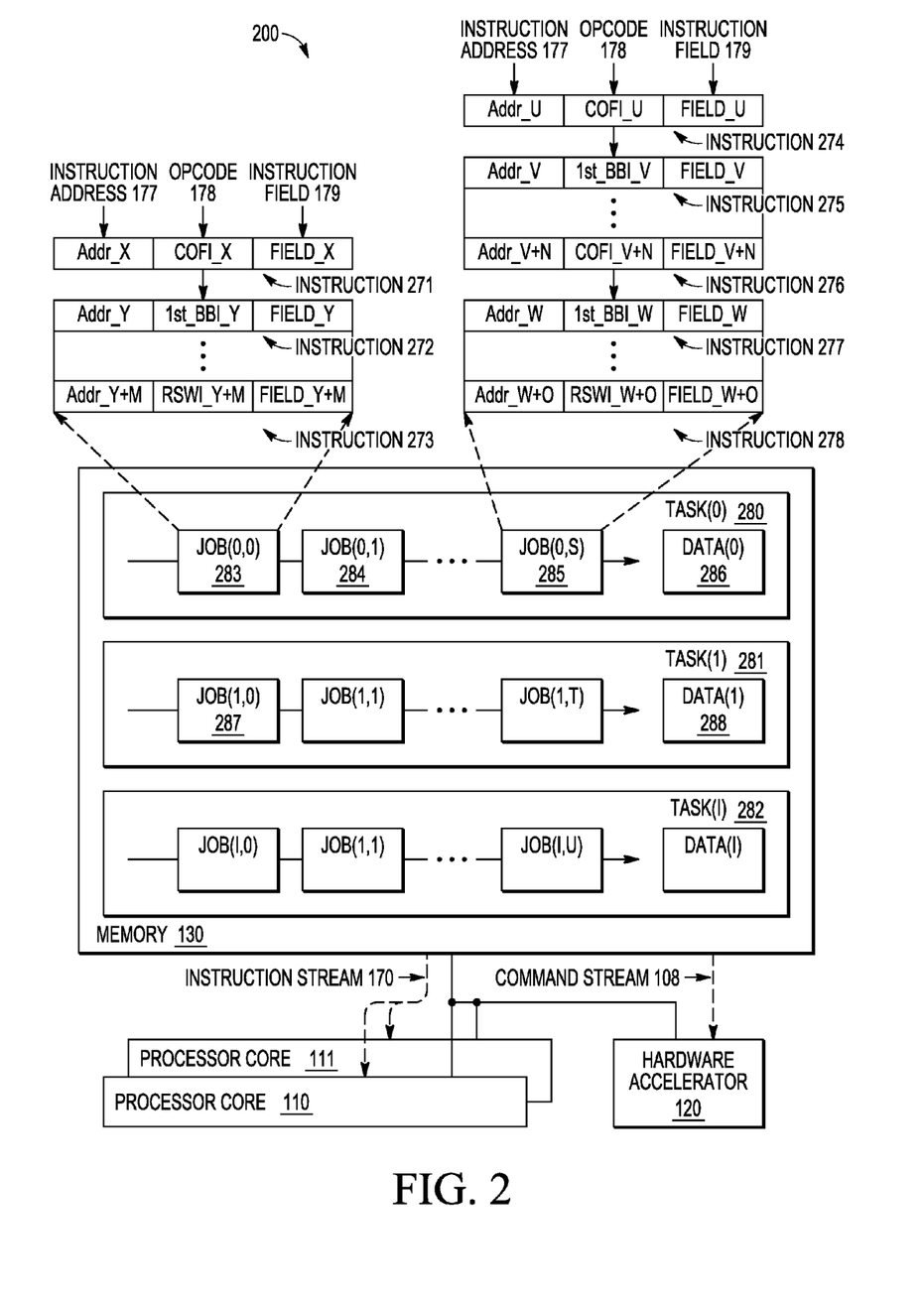
FIG. 2 is a block diagram illustrating a processor of the multi-core processing system of FIG. 1.

FIG. 2 illustrates a portion 200 of processor 101 of FIG. 1, where memory 130 includes one or more tasks 280-282. Task(0) 280, task(1) 281, and task(I) 282, each represent a particular program and corresponding data that is to be executed by processor 101, and for a portion of instruction stream 170. Tasks 280-282 are divided into one or more jobs, where each job generally represents an operation to be performed by the task without being interrupted by a task switch. The jobs of each task are represented by the mnemonic job (j,k), where j is an integer that indicates the job is associated with task(j), and k is an integer indicating the order of the job within the associated task, task(j). Further, the data associated with each task is represented by the mnemonic data(j) where j is the integer that indicates the data is associated with task(j). As such, task(0) 280 is divided into a job(0,0) 283, a job(0,1) 284, and a job(0,S) 285 and operates on task data(0) 286, task(1) 281 is divided into a job(1,0) 287, a job(1,1), and a job(1,T) and operates on task data(1) 288, and task(I) 281 is divided into a job(I,0), a job(I,1), and a job(I,U) and operates on task data(I).

For example, job(0,0) 283 can include a RSWI and job(0,1) 284 can correspond to an operation for which control has been transferred, in response to execution of the RSWI, from one core to another, such as from core 110 to core 111, as specified by the RSWI. Here, core 111 executes job(0,1) 284 with associated data(0) 286. As such, job(0,1) 284 includes instructions in accordance with the instruction set architecture for core 111. Core 111 may perform a dedicated operation, for example, maintaining a particular data base, and the like. Alternatively, job(0,1) 284 can correspond to an operation for which control has been transferred, in response to execution of the RSWI, from a core to a non-core resource, such as from core 110 to hardware accelerator 120, as specified by the RSWI. Here, hardware accelerator 120 executes job(0,1) 284 with associated data(0) 286. In this case, job(0,1) 284 can include commands that can be accessed by hardware accelerator 120, and may be specific to the particular type of hardware accelerator, such as a security device commands, encryption/decryption device commands, statistics device commands, and the like.

A job includes one or more basic blocks. A basic block is a set of instructions that has only one entry point and only one exit point. As such, a basic block includes a set of instructions where the last-in-order instruction is either a change of flow instruction (COFI), or a RSWI. The instruction immediately following a COFI is the first-in-order instruction of a next basic block, referred to as $1^{st}$_BBI. The last-in-order basic block of the job includes a RSWI as its last-in-order instruction. That is, the RSWI is the last-in-order instruction of the job.

Job(0,0) 283 includes a set of instructions associated with task(0) 280, including instructions 271, 272 and 273. Instruction 271 includes instruction address 177 with a value of Addr_X, opcode 178 with a value of COFI_X, and instruction field 179 with a value of Field_X. The opcode COFI_X indicates that instruction 271 is a COFI and has a position of Addr_X. Instruction 272 includes instruction address 177 with value of Addr_Y, opcode 178 with a value of $1^{st}$_BBI_Y, and instruction field 179 with value of Field_Y. Instruction 272, being the target of COFI instruction 271, and having opcode $1^{st}$_BBI_Y, indicates that instruction 272 is the first-in-order instruction of a basic block and has a position of Addr_Y. The set of instructions includes additional sequential instructions of the basic block (not shown). Instruction 273 is the last-in-order instruction of job(0,0) 283 and includes instruction address 177 with a value of Addr_Y+M, opcode 178 with a value of RSWI_Y+M, and instruction field 179 with value of Field_Y+M. The opcode RSWI_Y+M indicates that instruction 273 is a RSWI, that the instruction is the last-in-order instruction of job(0,0) 283, and that the instruction has a position of Addr_Y+M. The "M" is an integer that indicates the basic block includes M+1 sequential instructions, where the first-in-order basic block instruction 272 is at Addr_Y and the $M^{th}$ basic block instruction 273 at Addr_Y+M is the last-in-order instruction of the basic block. Note, the execution of the change of flow instruction 271 does not involve a switching a resource, loading another context, or scheduling a decision. In contrast, RSWI instruction 273 requires a switch to the resource specified by the instruction, and a scheduling decision to be made, and may require loading another context on the resource specified by the instruction and loading a different context on the resource that executed the RSWI. The scheduling decision may be pre-computed and the contexts pre-loaded before RSWI instruction 273 issues and executes.

Job(0,1) 284 is presumed to include a set of commands (not shown) that are to be executed by a non-core resource, such as hardware accelerator 120. The set of commands can be embedded into the task. Here, directly before a RSWI, the instructions will include setup instructions for storing parameters for the non-core resource, that is, to store the parameters to an agreed upon location in memory. Then the RSWI operates to transfer control to the non-core resource.

Job(0,S) 285 includes a set of instructions associated with task(0) 280, including instructions 274, 275, 276, 277, and 278. Instruction 274 includes instruction address 177 with a value of Addr_U, opcode 178 with a value of COFI_U, and instruction field 179 with a value of Field_U. The opcode COFI_U indicates that instruction 274 is a COFI and has a position of Addr_U. Instructions 275 and 276 are first-in-order and last-in-order instructions of a first-in-order basic block of job(0,S) 285 having N+1 instructions, as indicated by the opcodes $1^{st}$_BBI_V and COFI_V+N in the respective opcode 178, and having respective instruction address 177 values of Addr_V and Addr_V+N. Instructions 277 and 278 are the first-in-order and the last-in-order instructions of a last-in-order basic block of job(0,S) 285 having O+1 instructions, as indicated by the opcodes $1^{st}$_BBI_W and RSWI_W+O in the respective opcode 178, and having respective instruction address 177 values of Addr_W and Addr_W+O. The first-in-order basic block ends with COFI instruction 276 and does not involve a resource and context switch. The second basic block ends with the RSWI instruction 278 and requires a scheduling decision and a resource switch as specified by the instruction, similar to the RSWI instruction 273 above.

In a particular embodiment, processor 101 requests tasks 280-282 from an external device such as processor 102 or external memory 103, receives the tasks via communication bus 104, and stores the tasks in memory 130. In another embodiment, processor 101 requests and receives tasks 280-281 from I/O interface device 106, and stores the tasks in memory 130. In yet another embodiment, external memory 103 or I/O interface device 106 stores the tasks into memory 130 and loads task information into hardware task scheduler 140. Hardware task scheduler 140 then directs one of processor cores 110 or 111 to start executing one of the new tasks. In a particular embodiment (not shown), a job includes one basic block where the last-in-order instruction is a RSWI. The skilled artisan will recognize that a job can be defined in program code based upon an understanding of a programmer or compiler as to the resources needed by particular code portions when executed by one of the resources. The jobs of a task can be indicated in the task code through the use of job transition instructions that are located in the task software at a job boundary, such as the last-in-order instruction of a job, such as a RSWI.

FIGS. 3-8, described in detail below, illustrate processor 101 of the multi-core processing system 100 without reference to core 111, and execution flows for performing task switching operations corresponding tasks 280-282.

Figure 3:
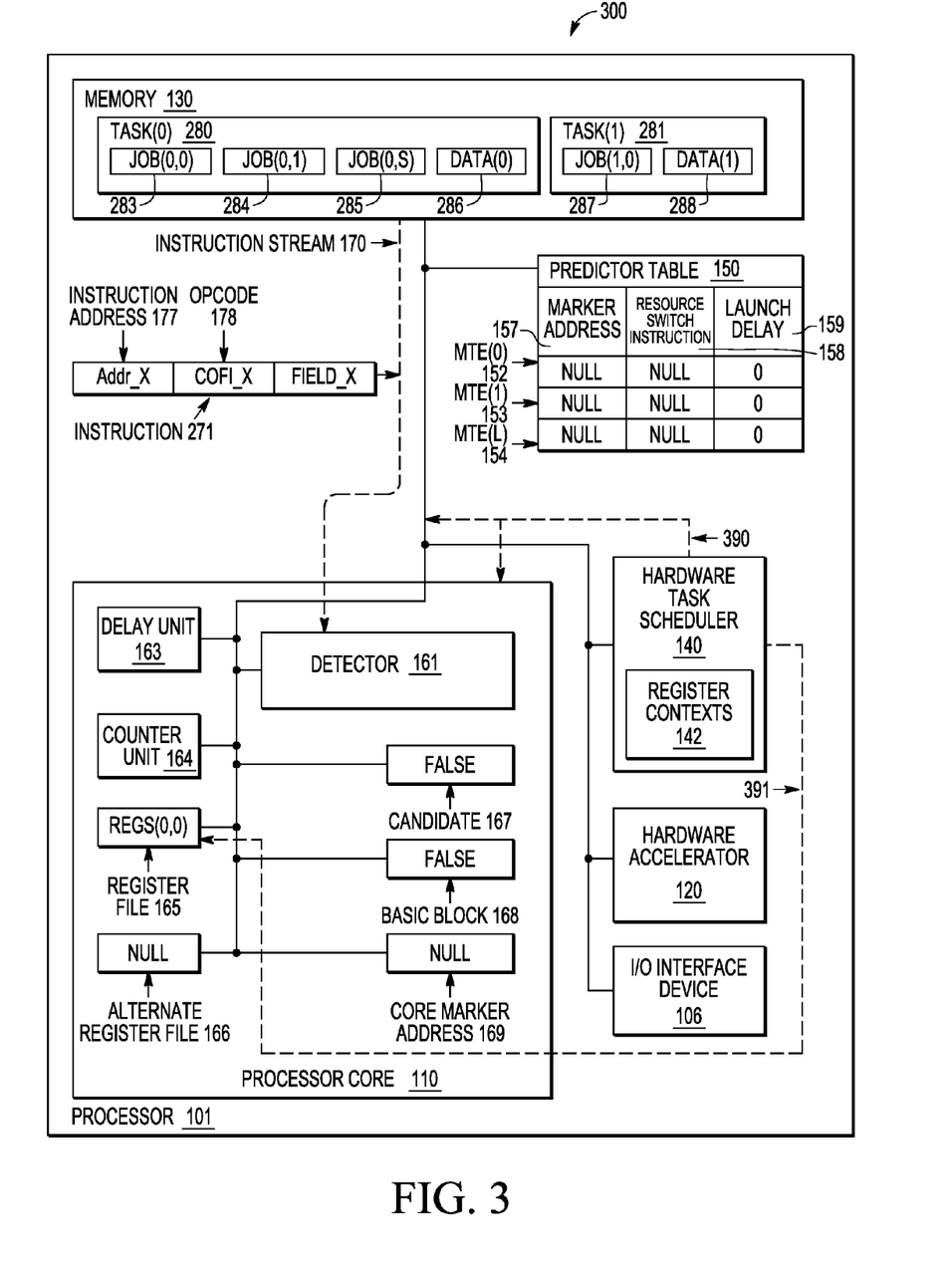
FIGS. 3-8 illustrate the processor of FIG. 2 showing various stages of an execution flow of a task assignment.

FIG. 3 illustrates an execution flow 300 on processor 101, including steps 390 and 391 for showing an instruction stream and the associated task assignment. In an embodiment, the processor 101 pre-configures hardware task scheduler 140 and the devices of the processor and core 110 during a configuration process prior to any data being received at the processor. In another embodiment, processor 101 configures the task scheduler 140 and the devices of the processor and core 110 during initialization, restart, or upon receipt of an initial datum of data associated with a specific task. Configuring hardware task scheduler 140 may include initializing a scheduling decision table (not shown) to a state indicating that no scheduling decisions have been made. During operation, data corresponding with tasks 280-282 is received by processor 101 via communication bus 104 or I/O interface device 106 and the data can be stored in memory 130 along with the corresponding task. For example, data(0) 286 can be received for task(0) 280.

In step 390, in response to receiving data(0) 286, hardware task scheduler 140 makes a scheduling decision to assign and schedule job(0,0) 283 to process the data(0) on core 110. As such, instruction stream 170 provides instruction 271 to core 110. As noted above, instruction 271 includes instruction address 177 having the value Addr_X, and opcode 178 having the value COFI_X, indicating that instruction 271 is a COFI.

In step 391, hardware task scheduler 140 causes register file 165 to be loaded with register context for job(0,0) 283, as indicated by the mnemonic Regs(0,0) in the register file. The other devices of processor 101 are shown with their reset or initial state values, prior to processing any instructions. For example, alternate register file 166 has the value Null, indicating that no other task's context registers have been pre-loaded into core 110. Candidate flag 167 and basic block flag 168 have the value of False, and core marker address field 169 has the value of Null, indicating that no prior task has been processed on core 110. Task switch marker table 150 is also empty, indicating that no prior task's instruction set information has been maintained, as shown by each of the MTE(0) 152, MTE(1) 153, and MTE(L) 154, having a Null value for both their MTE marker address 157, and switch instruction attributes 158, and a value of zero (0) for launch delay 159.

Figure 4:
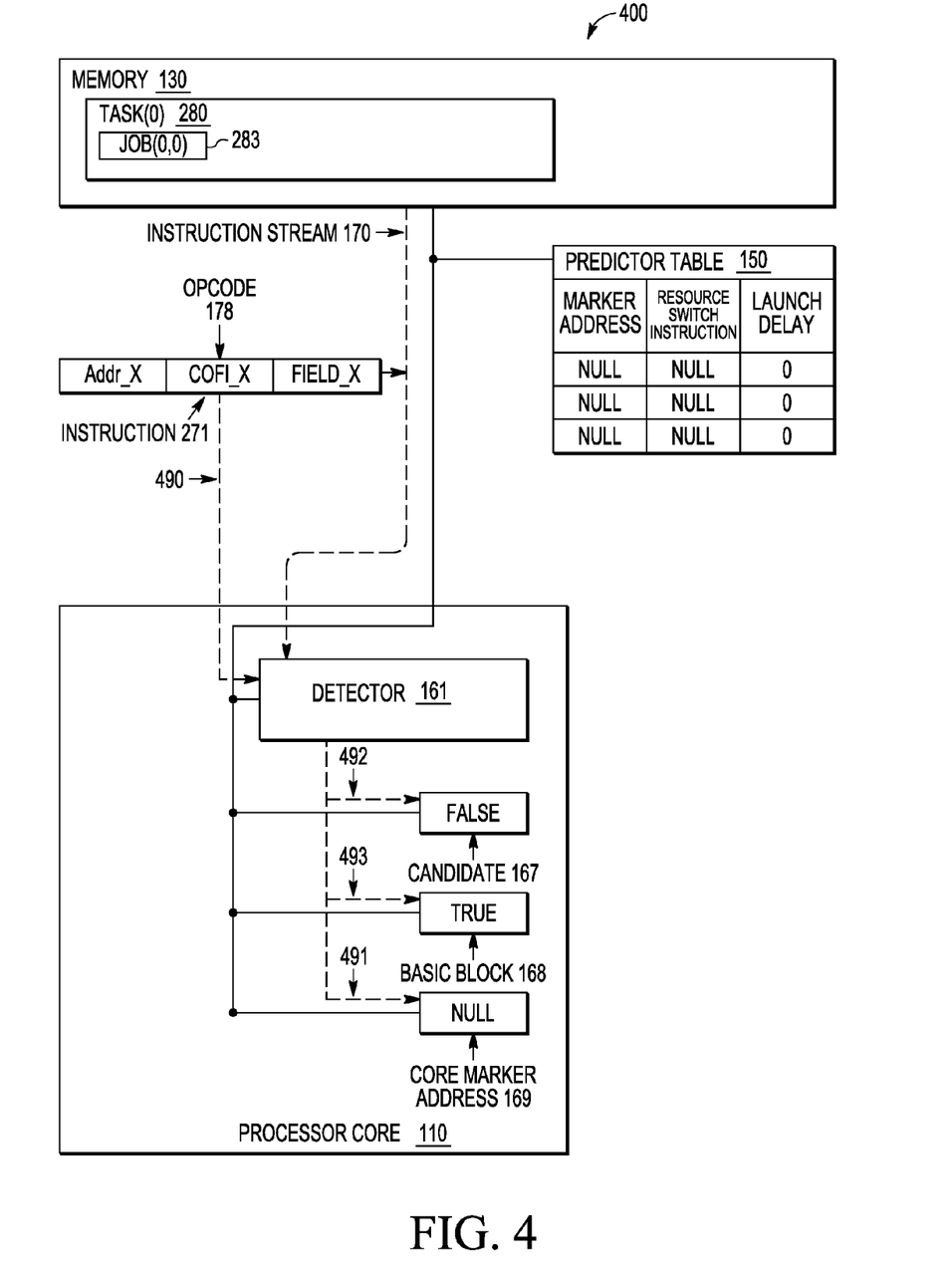

FIG. 4 illustrates an execution flow 400 on processor 101 that is executed after execution flow 300, and that includes steps 490-493 for showing a response to COFI instruction 271. In step 490, detector 161 receives instruction 271, and determines that the instruction is a COFI, as indicated by the value of COFI_X in opcode 178. In step 491, detector 161 maintains the Null address at core marker address field 169 to indicate that the first-in-order instruction of a basic block has not been received. Further, in step 492, because the target of COFI instruction 271, that is the first-in-order instruction of a basic block, has not been received, detector 161 maintains candidate flag 167 as False, to indicate that the detector has not determined that the first-in-order instruction of a basic block to be received is a candidate for entry in task switch marker table 150. In step 493, detector 161 sets basic block flag 168 to True to indicate that the next instruction of the instruction stream 170 will be the beginning of a basic block. In a step (not shown), core 110 executes instruction 271. In the following description, the execution of the subject instructions by core 110 will be implied.

Figure 5:
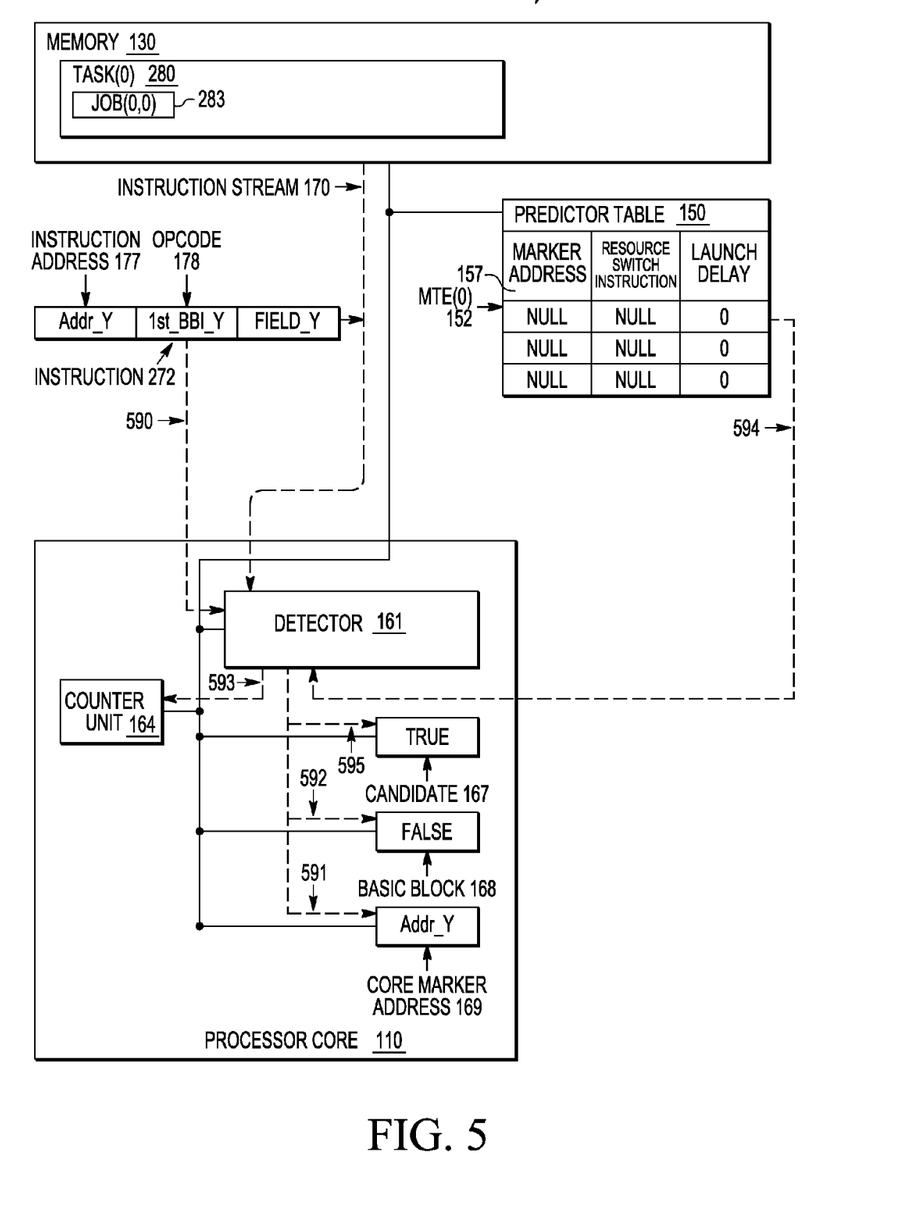

FIG. 5 illustrates an execution flow 500 on processor 101 that is executed after execution flow 400, and that includes steps 590-595 for an execution flow of a first-in-order basic block instruction ($1^{st}$_BBI). In step 590, detector 161 receives instruction 272, and determines that the instruction is a BBI, as determined by the fact that the instruction is the first-in-order instruction received after COFI instruction 271 in FIG. 4. In step 591, in response to determining that the instruction 272 is a $1^{st}$_BBI, also referred to as the marker instruction, detector 161 stores the Addr_Y value from instruction address 177, referred to as the marker address, in core marker address field 169 for future use. In step 592, detector 161 sets basic block flag 168 to False to indicate that the $1^{st}$_BBI has been received. In step 593, detector 161 requests counter unit 164 to begin counting the machine cycles between issue of the marker instruction and issue of a RSWI, as described below. In step 594, detector 161 determines if the marker address at core marker address field 169 matches marker address 157 of any of MTE(0) 152, MTE(1) 153, or MTE(L) 154, as indicated by the marker address 157 having a Null value for all of the MTEs. In step 595, in response to determining that the marker address is not in task switch marker table 150, detector 161 sets candidate flag 167 to True, to indicate that the marker address is a candidate for entry into task switch marker table 150.

Figure 6:
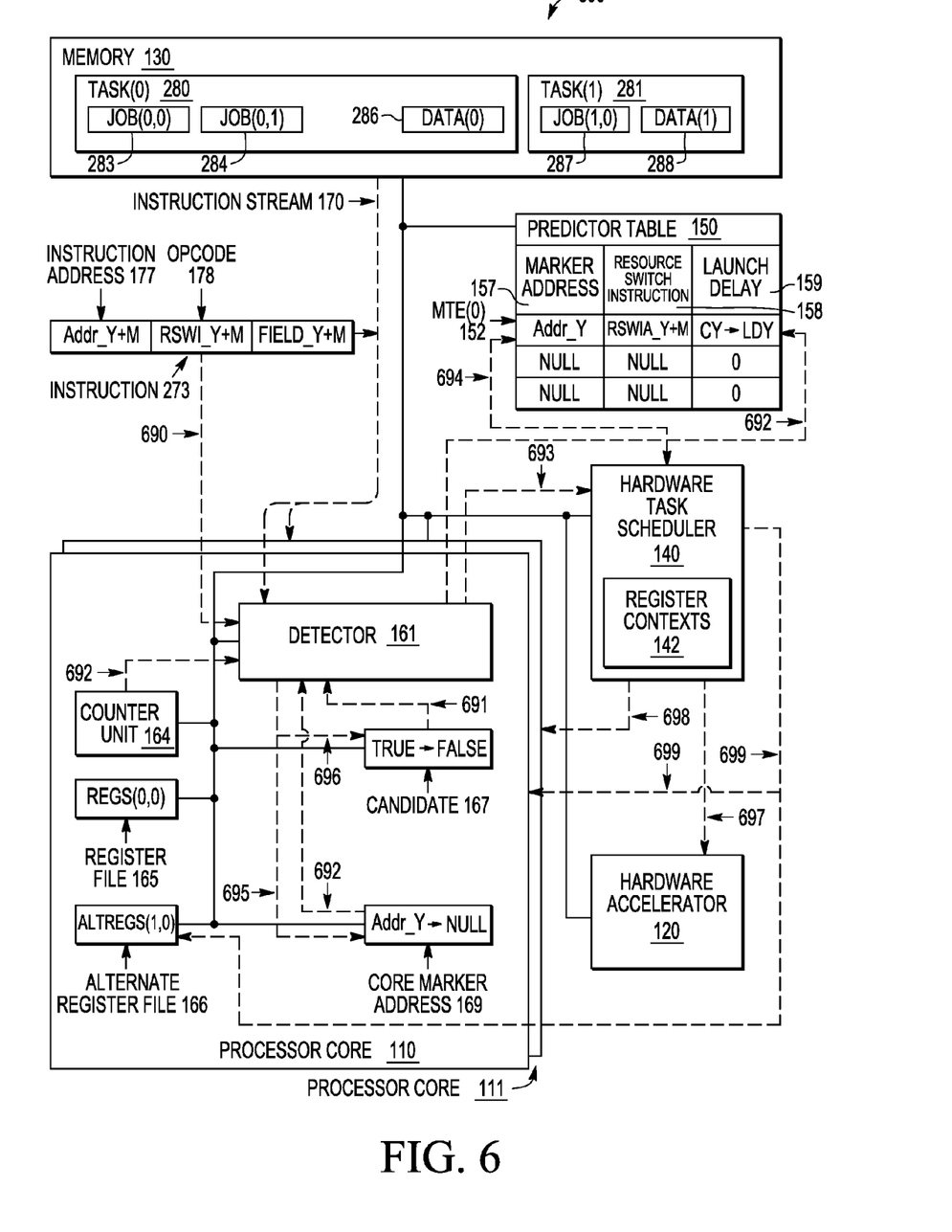

FIG. 6 illustrates an execution flow 600 on processor 101 that is executed after execution flow 500, and that includes steps 690-699 for an execution flow of a RSWI. In step 690, detector 161 receives instruction 273, and determines that the instruction is a RSWI, as indicated by the RSWI_Y+M value in opcode 178. In step 691, in response to determining that instruction 273 is the RSWI, detector 161 determines that candidate flag 167 is set to True, indicating that the basic block currently being executed is a candidate for entry into task switch marker table 150. In step 692, detector 161 stores the Addr_Y value from core marker address 169, the RSWI_Y+M value from opcode 178, and the current cycle count value (CY) from counter unit 164 at marker address 157, resource switch instruction attributes 158, and launch delay 159, respectively, of a vacant MTE of task switch marker table 150, such as MTE(0) 152.

In step 693, detector 161 communicates an indication to hardware task scheduler 140 that task switch marker table 150 has been updated, and provides the Addr_Y value from core marker address 169 to the task scheduler. In step 694, hardware task scheduler 140 retrieves MTE(0) 152 from task switch marker table 150, because marker address 157 in the MTE(0) matches the marker address value, Addr_Y, received from detector 161. Hardware task scheduler 140 calculates a new launch delay based on information in MTE(0) 152 including the RSWI_Y+M value from resource switch instruction attributes 158 and the current cycle count value from launch delay 159, and stores an updated launch delay of LDY at the launch delay of the MTE(0). In a particular embodiment, the updated launch delay is not calculated by hardware task scheduler. Here, the number of processor cycles that are needed to perform a task switch can be known for multi-core processing system 100, and the updated launch delay is calculated directly when the cycle count is provided to launch delay 159 for the particular MTE 151.

The resource switch instruction attributes 158 allow for the correct scheduling decision to be made, and may include, for example, one or more of: a target destination of RSWI instruction 273; a type of the resource requested, such as a specific type of hardware accelerator; a particular dedicated operation to be performed by a core, such as maintaining a particular data base; a run time associated with execution of a particular job on associated data on the requested resource; features of the resource requested, such as features of hardware accelerator 120, and the like. Launch delay 159 of MTE(0) 152 as stored by detector 161, and prior to the update by hardware task scheduler 140, is the number of machine cycles between the issue of marker instruction 272 of FIG. 5 and the issue of RSWI instruction 273. The updated launch delay is less than the originally stored launch delay 159 of MTE(0) 152, having a value of the number of machine cycles that occur between the issue of marker instruction 272 and the launch of the pre-computed scheduling decision, such that the updated launch delay will minimize or eliminate the latency of the scheduling decision and the context pre-loading from the execution of RSWI instruction 273. As a result, the scheduling decision is made by the time the resource switch is requested. Hardware task scheduler 140 also calculates the updated launch delay such that the decision window (the time between the launch of a scheduling decision pre-computation request and the issue of an associated RSWI) is as small as possible. Thus, hardware task scheduler 140 is able to consider additional information just ahead of the time the RSWI issues, allowing more complete and correct scheduling decisions to be made.

In step 695, detector 161 stores the Null address at core marker address field 169, to indicate that the first-in-order instruction of a next basic block has not been received. In step 696, detector 161 resets candidate flag 167 to False, to indicate that a next candidate for entry in task switch marker table 150 has not been identified. In step 697, hardware task scheduler 140 makes a scheduling decision to assign and schedule job(0,1) 284, the next job in the order of jobs within task(0) 280, on a resource such as hardware accelerator 120, as specified in RSWI instruction 273. In addition, hardware task scheduler 140 causes any associated context to be loaded into the hardware accelerator, and switches the job(0,1) to be executed by the hardware accelerator. Hardware accelerator 120 begins execution of a set of commands associated with job(0,1) 284. In a particular embodiment, in step 698, hardware task scheduler 140 makes the scheduling decision to assign and schedule job(0,1) 284 on a core resource, such as the core 111, as specified in RSWI instruction 273, switches the job(0,1) to be executed by the core, and the core begins execution of the job(0,1). If necessary, hardware task scheduler 140 causes the context associated with the job(0,1) to be loaded in core 111.

In step 699, hardware task scheduler 140 makes another scheduling decision to assign and schedule another job, such as job(1,0) 287 of task(1) 281, on the current resource, core 110. In addition, hardware task scheduler 140 causes the context for job(1,0) to be loaded in to alternate register file 166, as depicted by the value of AltRegs(1,0), and switches the job(1,0) to be executed by core 110. Upon completion of RSWI instruction 273, core 110 switches the mapping of the architectural registers from register file 165 to alternate register file 166 and begins execution of job(1,0) 287.

Figure 7:
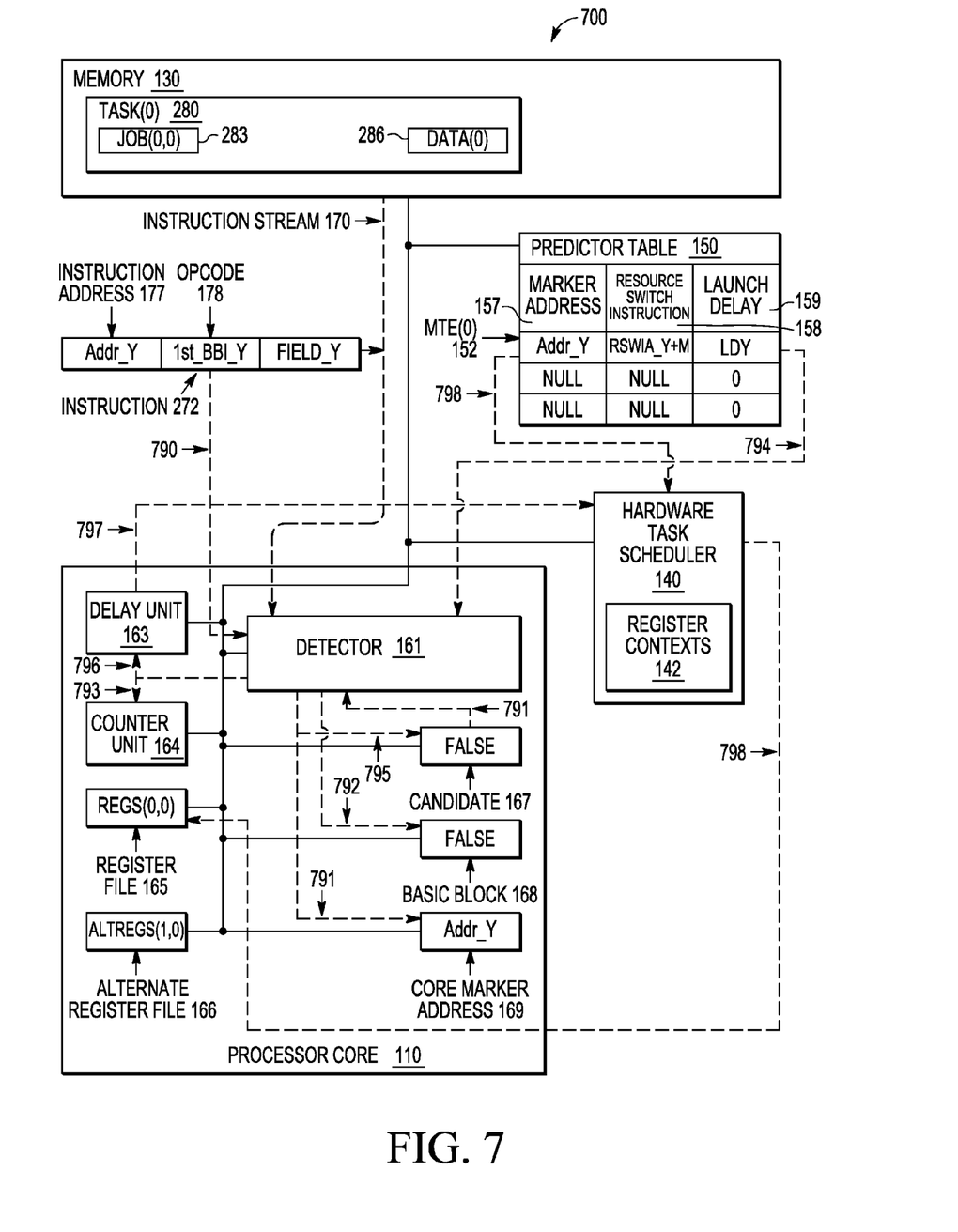

FIG. 7 illustrates an execution flow 700 on processor 101 that is executed after execution flow 600, and that includes steps 790-798 for an execution flow of a subsequent instance of a $1^{st}$_BBL In step 790, detector 161 receives instruction 272, and determines that the instruction is a $1^{st}$_BBI, as determined by the fact that the instruction is the first-in-order instruction received after a previous COFI or RSWI. In step 791, in response to determining that the instruction 272 is a 1st_BBI, or marker instruction, detector 161 stores the Addr_Y value, or marker address, from instruction address 177, in core marker address field 169 for future use. In step 792, detector 161 sets basic block flag 168 to False to indicate that the 1st_BBI has been received. In step 793, detector 161 requests counter unit 164 to begin counting the machine cycles between issue of the marker instruction and issue of a RSWI.

In step 794, detector 161 determines if the marker address at core marker address field 169 matches marker address 157 of any of MTE(0) 152, MTE(1) 153, or MTE(L) 154. Here detector 161 determines that marker address 157 of MTE(0) 152 matches core marker address field 169, as indicated by the Addr_Y value of marker address 157. In step 795, in response to determining that the Addr_Y value is already in task switch marker table 150, detector 161 sets candidate flag 167 to False, to indicate that the marker address is not a candidate for entry in task switch marker table 150. In step 796, detector 161 requests delay unit 163 to begin a countdown of launch delay 159 of LDY cycles, that is, the number of cycles (LDY) from launch delay 159 of MTE(0) 152. In step 797, in response to completing the countdown of the LDY cycles, delay unit 163 communicates the marker address, Addr_Y, associated with MTE(0) 152, to hardware task scheduler 140 for a scheduling decision pre-computation request.

In step 798, in response to receiving the scheduling decision pre-computation request from delay unit 163, hardware task scheduler 140 retrieves MTE(0) 152 from task switch marker table 150 and performs the scheduling decision pre-computation based on information in MTE(0), including the resource switch instruction attributes 158 of RSWIA_Y+M. In a particular embodiment, hardware task scheduler 140 stores the scheduling decision for the marker address of Addr_Y at MTE(0) 152 (not shown). Alternatively, the hardware task scheduler 140 stores the scheduling decision for the marker address of Addr_Y at a scheduling decision table within the hardware task scheduler.

Figure 8:
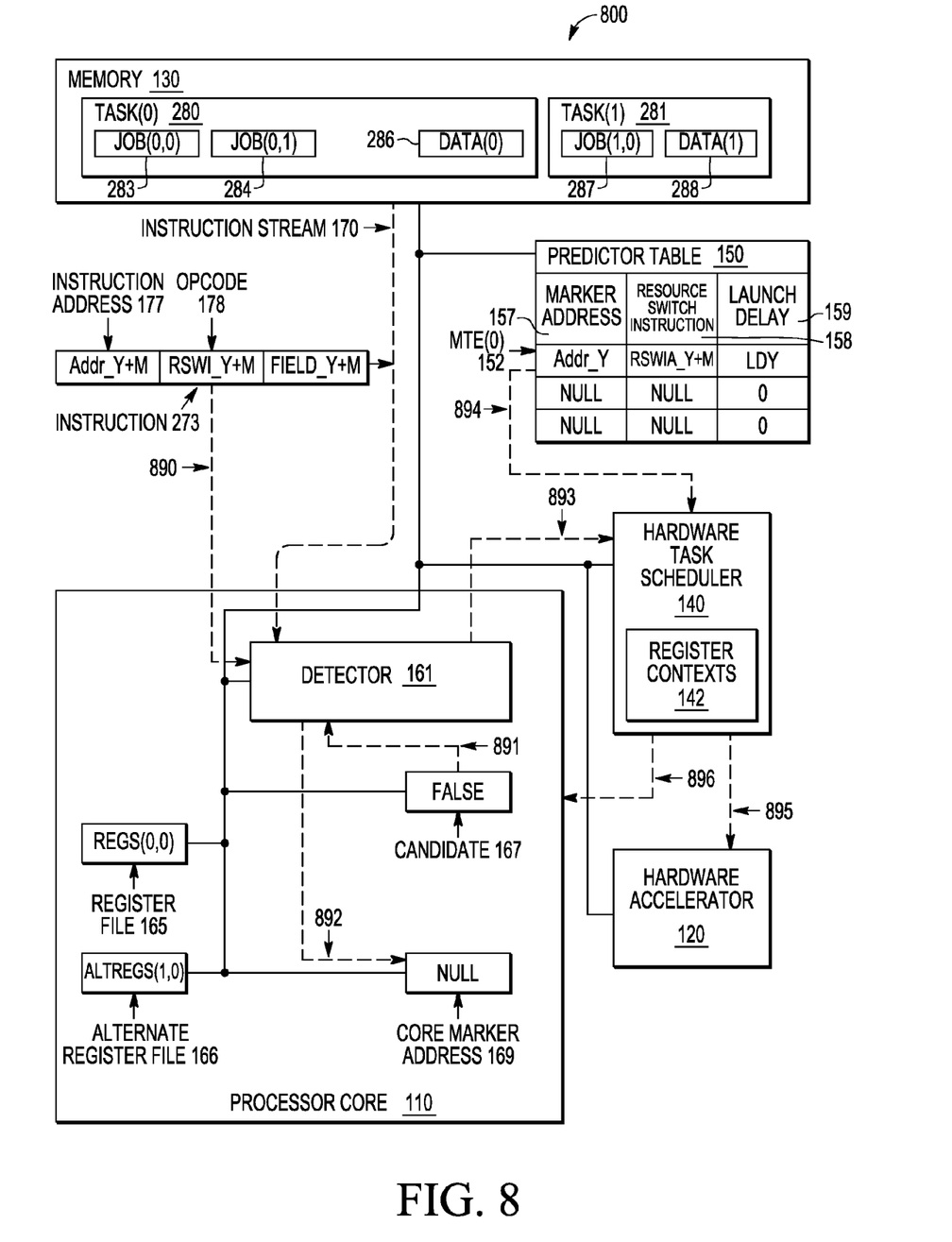

FIG. 8 illustrates an execution flow 800 on processor 101 that is executed after execution flow 700, and that includes steps 890-896 for an execution flow of a subsequent instance of a RSWI. In step 890, detector 161 receives instruction 273, and determines that the instruction is a RSWI, as indicated by the RSWI_Y+M value in opcode 178. In step 891, in response to determining that instruction 273 is the RSWI, detector 161 determines that candidate flag 167 is set to False, indicating that the basic block currently being executed is not a candidate for entry into task switch marker table 150. In step 892, in response to determining that the candidate flag 167 is set to False, detector 161 stores the Null address at core marker address field 169. In step 893, detector 161 communicates a task switch marker table updated indicator to hardware task scheduler 140, indicating that task switch marker table 150 has been updated, and provides the Addr_Y value from core marker address field 169 to the hardware task scheduler.

In step 894, in response to receiving the task switch marker table updated indicator and the core marker address field 169 from detector 161, hardware task scheduler 140 retrieves the pre-computed scheduling decision of MTE(0) 152, because marker address 157 matches core marker address field 169. In step 895, hardware task scheduler 140 makes a scheduling decision to assign and schedule job(0,1) 284, the next job in the order of jobs within task(0) 280, on a resource, such as hardware accelerator 120, as specified in RSWI instruction 273, causes any associated context to be loaded into the hardware accelerator, and switches the job(0,1) to be executed by the hardware accelerator. Hardware accelerator 120 begins execution of a set of commands associated with job(0,1) 284. In a particular embodiment, in step 896, hardware task scheduler 140 makes the scheduling decision to assign and schedule job(0,1) 284 on a core resource, such as the core 111, as specified in RSWI instruction 273, causes the context associated with the job(0,1) to be loaded in core 111, switches the job(0,1) to be executed by the core, and the core begins execution of the job(0,1). Here, upon completion of the execution of RSWI instruction 273, core 110 switches the mapping of the architectural registers from register file 165 to alternate register file 166 and begin execution of job(1,0) 287. The pre-computed scheduling decision for RSWI instruction 273 allows the latency of the scheduling decision and the context pre-loading to be minimized or eliminated from the execution of the RSWI instruction 273.

Thus, a processor can detect resource switch instructions in an instruction stream and automatically insert an entry in a task switch marker table, assign a marker address corresponding to the beginning of the basic block containing the resource switch instruction, and assign a number of cycles to delay following the marker address before launching a scheduling decision. The processor can further record the task switch instruction attributes to allow for the correct scheduling decision. Whenever a next address in the instruction stream matches the marker address, the processor can wait a launch delay cycles, and then begin pre-execution of the scheduling decision using the stored switch instruction attributes. The processor can also monitor the actual latency between completion of the instruction associated with the marker address and adjust the launch delay to ensure the decision window is as small as possible.

In a first embodiment of the present disclosure, a processing system includes a processor core that receives a first instance of a first instruction of a first basic block, where the first instruction is a first-in-order instruction of the first basic block, determines that a last-in-order instruction of the first basic block is a first instance of a RSWI, receives a second instance of the first instruction, and to provide an indication in response to receiving the second instance of the first instruction. The processing system also includes a task scheduler that initiates a resource switch in response to the first indication, where the resource switch is initiated based on a cycle count that indicates a number of processor cycles between receiving the first instance of the first instruction and receiving the first instance of the RSWI.

In an aspect of the first embodiment, the processor core determines that the first instruction is the first-in-order instruction of the first basic block based upon an address associated with the first instruction. In another aspect, the processor core determines that the first instruction has not been previously received by the processor core based on the address. In still another aspect, the processor core stores the address in a task switch marker table of the processing system. In yet another aspect, the processor core starts a counter in response to receiving the first instance of the first instruction, where the counter is incremented for each processor cycle after the first instruction is received. In another aspect, the cycle count includes a value of the first counter in response to receiving the first instance of the RSWI. In yet another aspect, initiating the resource switch is based on a launch delay, where the launch delay is associated with a number of processor cycles for processing a resource switch. In another aspect, the launch delay includes a difference of the cycle count and the second number of processor cycles.

In a second embodiment of the present disclosure, a method includes receiving, by a processor core of a processing system, a first instance of a first instruction of a first basic block, where the first instruction is a first-in-order instruction of the first basic block, determining, by the processor core, that a last-in-order instruction of the first basic block is a RSWI, receiving, by the processor core, a second instance of the first instruction, providing, by the processor core, an indication in response to receiving the second instance of the first instruction, and initiating, by a task scheduler of the processing system, a resource switch in response to the first indication, where the resource switch is initiated based on a cycle count that indicates a number of processor cycles between receiving the first instance of the first instruction and receiving the first instance of the RSWI.

In an aspect of the second embodiment, the method includes receiving, by the processor core, a last instruction of another basic block immediately prior to receiving the first instruction, and providing, by the processor core, another indication that the first instruction is the first-in-order instruction in the first basic block in response to receiving the last instruction. In another aspect, the method includes storing an address associated with the first instruction in response to the second indication. In yet another aspect, the method includes determining that the first instruction is the first-in-order instruction of the first basic block based on the address. In yet another aspect, the method includes determining that the first instruction has not been previously received by the processor core based upon the address. In still another aspect, the method includes storing, by the processor core, a launch delay in a counter in response to receiving the second instance of the first instruction, where the launch delay is a difference of the cycle count and a number of processor cycles associated with processing a resource switch, and decrementing, by the processor core, the counter for each processor cycle after receiving the first instruction, where initiating the resource switch by the task scheduler is in response to the counter being decremented to a predetermined value. In another aspect, in initiating the resource switch, the method further includes loading, by the task-scheduler, context information for a next basic block of instructions into an alternate register file of the processor core. In yet another aspect, the method includes receiving, by the processor core, a second instance of the RSWI, receiving, by the processor core, a second instruction of another basic block, immediately after receiving the RSWI the second time, the second instruction being a first-in-order instruction of the second basic block, and executing, by the processor core, the second instruction using the context information from the alternate register file.

In a third embodiment of the present disclosure a processor core of a multi-core processing system includes a detector that stores an address associated with a first instruction received by the processor core, where the first instruction is a first instance of a first-in-order instruction of a first basic block; starts a counter unit in response to receiving the first instruction, wherein the counter is incremented for each processor cycle after the first instance of the first instruction is received; determines that a last-in-order instruction of the first basic block is a RSWI, stores a cycle count from the counter unit in response to determining that the second instruction is the first instance of the RSWI, where the stored cycle count indicates a number of processor cycles received by the processor between receiving the first instruction and receiving the first instance of the RSWI, determines that a second instruction received by the processor core is a second instance of the first-in-order instruction, and provides a first indication to a task scheduler in response to determining that the processor core received the second instruction.

In an aspect of the third embodiment, the processor core further includes a candidate flag to indicate that the first basic block is a candidate for entry into a task switch marker table of the multi-core processing system, where, in storing the address associated with the first instruction, the detector determines that the candidate flag indicates that the first basic block is the candidate for entry into the task switch marker table. In another aspect, the processor core includes a basic block flag to indicate that the first instruction is the first instruction in the first basic block, where the detector further determines that a third instruction received by the processor core immediately prior to receiving the first instruction is a last-in-order instruction of another basic block, and sets the basic block flag in response to receiving the third instruction. In yet another aspect, the processor core further includes a delay unit to store a launch delay that is decremented by one for each instruction received by the processor core after receiving the first instruction, where the detector stores the launch delay in response to receiving the second instance of the first-in-order instruction, and where providing the first indication is in response to the delay unit being decremented to a pre-determined value.

It will be appreciated that the devices disclosed herein can be implemented in various manners using various types of memory.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    processing, by a processor core of a processing system, a first instruction of a first instance of a first basic block, wherein the first instruction of the first instance of the first basic block is a first-in-order instruction of the first instance of the first basic block;
    determining, by the processor core of the processing system, that a last-in-order instruction of the first instance of the first basic block is a resource switch instruction (RSWI);
    in response to determining that the last-in-order instruction of the first instance of the first basic block is the RSWI, storing, by the processor core of the processing system, a cycle count indicating a first number of processor cycles occurring between processing of the first instruction of the first instance of the first basic block and processing of the RSWI;
    processing, by the processor core of the processing system, a first instruction of a second instance of the first basic block; and
    initiating, by a hardware task scheduler of the processing system, a resource switch in response to processing the first instruction of the second instance of the first basic block, wherein the resource switch is initiated based on the cycle count.

2. The method of claim 1, further comprising:
    receiving, by the processor core of the processing system, a last-in-order instruction of a first instance of a second basic block immediately prior to receiving the first instruction of the first instance of the first basic block; and
    providing, by the processor core of the processing system, a first indication that a next instruction is a first-in-order instruction of the first instance of the first basic block, wherein the next instruction is the first instruction of the first instance of the first basic block.

3. The method of claim 2, further comprising:
    storing, by the processor core of the processing system, an address associated with the next instruction in response to the first indication.

4. The method of claim 3, further comprising:
    determining, by the processor core of the processing system, that the next instruction is the first-in-order instruction of the first instance of the first basic block based upon the address.

5. The method of claim 3, wherein storing the cycle count is in response to determining that the cycle count of the first basic block is not currently stored.

6. The method of claim 1, further comprising:
    storing, by the processor core of the processing system, a launch delay in a first counter in response to receiving the first instruction of the second instance of the first basic block, wherein the launch delay is a difference of the cycle count and a number of processor cycles associated with processing the resource switch; and
    wherein initiating the resource switch by the hardware task scheduler is based upon the stored launch delay.

7. The method of claim 1, further comprising:
    in response to initiating the resource switch, loading, by the processor core of the processing system, context information for a next basic block of instructions into an alternate register file of the processor core of the processing system.

8. The method of claim 7, further comprising:
    receiving, by the processor core of the processing system, the RSWI of the second instance of the first basic block;
    receiving, by the processor core of the processing system, a second instruction of a first instance of a second basic block, immediately after receiving the RSWI of the second instance of the first basic block, wherein the second instruction of the first instance of the second basic block is a first-in-order instruction of the first instance of the second basic block; and
    executing, by the processor core of the processing system, the second instruction of the first instance of the second basic block using the context information from the alternate register file of the processor core of the processing system.

9. A processing system comprising:
    a processor pipeline to receive an instruction stream;
    a detector circuit including:
        a basic block detector circuit coupled to the processor pipeline configured to determine that the processor pipeline received a first instruction of a first instance of a first basic block, to determine that the first instruction of the first instance of the first basic block is a first-in-order instruction of the first instance of the first basic block, and to determine that a last-in-order instruction of the first instance of the first basic block is a resource switch instruction (RSWI); and
        an indicator circuit coupled to the basic block detector circuit configured to provide a first indication in response to the basic block detector circuit determining that the processor pipeline received a first instruction of a second instance of the first basic block; and
    a hardware task scheduler coupled to the indicator circuit configured to initiate a resource switch, in response to the first indication, at a time subsequent to the first instruction of the first instance of the first basic block being received that is based on a cycle count that indicates a first number of processor cycles that occurred between receiving the first instruction of the first instance of the first basic block and receiving the RSWI.

10. The processing system of claim 9, wherein the basic block detector circuit is further configured to determine that the first instruction of the first instance of the first basic block is the first-in-order instruction of the first instance of the first basic block based upon an address associated with the first instruction of the first instance of the first basic block.

11. The processing system of claim 10, wherein the detector circuit is configured to store the address associated with the first instruction of the first instance of the first basic block for a prior instance of the first basic block.

12. The processing system of claim 9, further comprising: a counter configured to maintain the cycle count.

13. The processing system of claim 12, wherein the cycle count is based upon a number of cycles between when processing of the first instruction of the first instance of the first basic block begins and when processing of the RSWI begins.

14. The processing system of claim 13, wherein the hardware task scheduler is further configured to initiate the resource switch based upon a difference between the cycle count and a number of processor cycles needed to process the resource switch.

15. The processing system of claim 9, wherein the hardware task scheduler is further configured to initiate the resource switch based upon a number of processor cycles needed to process the resource switch.

16. A method comprising:
   determining, by a basic block detector circuit of a processing system, that a processor pipeline of the processing system received a first instruction of a first instance of a first basic block;
   determining, by the basic block detector circuit of the processing system, that the first instruction of the first instance of the first basic block is a first-in-order instruction of the first instance of the first basic block;
   determining, by the basic block detector circuit of the processing system, that a last-in-order instruction of the first instance of the first basic block is a resource switch instruction (RSWI);
   determining, by the basic block detector circuit of the processing system, that the processor pipeline of the processing system received a first instruction of a second instance of the first basic block;
   providing, by an indicator circuit of the processing system, an indication in response to the basic block detector circuit of the processing system determining that the processor pipeline of the processing system received the first instruction of the second instance of the first basic block; and
   initiating, by a hardware task scheduler of the processing system, a resource switch, in response to the indication, at a time subsequent to the first instruction of the first instance of the first basic block being received that is based on a cycle count that indicates a first number of processor cycles that occurred between receiving the first instruction of the first instance of the first basic block and receiving the RSWI.

17. The method of claim 16, further comprising:
   storing, by the basic block detector circuit of the processing system, an address associated with the first instruction of the first instance of the first basic block;
   wherein determining that the first instruction of the first instance of the first basic block is a first-in-order instruction of the first instance of the first basic block is based upon the address associated with the first instruction of the first instance of the first basic block.

18. The method of claim 16, further comprising:
   maintaining, by a counter of the processing system, the cycle count;
   wherein initiating the resource switch is based upon the cycle count.

19. The method of claim 18, wherein initiating the resource switch is based upon a difference between the cycle count and a number of processor cycles needed to process the resource switch.

* * * * *